(No Model.)

C. E. MASON.
LOCK VALVE AND FAUCET.

No. 447,962. Patented Mar. 10, 1891.

Witnesses,
G. A. Nourse
H. C. Lee.

Inventor,
Charles E. Mason
By Dewey & Co,
att'ys

UNITED STATES PATENT OFFICE.

CHARLES E. MASON, OF SAN FRANCISCO, CALIFORNIA.

LOCK-VALVE AND FAUCET.

SPECIFICATION forming part of Letters Patent No. 447,962, dated March 10, 1891.

Application filed November 10, 1890. Serial No. 370,969. (No model.)

*To all whom it may concern:*

Be it known that I, CHARLES E. MASON, a citizen of the United States, residing in the city and county of San Francisco, State of California, have invented an Improvement in Lock-Valves and Faucets; and I hereby declare the following to be a full, clear, and exact description of the same.

My invention relates to a device which I call a "lock-valve and faucet."

It consists of an inserted bushing fixed in a stave of the cask or tank, a cylindrical non-rotatable sleeve fitted to said bushing with abutting shoulders and intermediate packing, and a nut whereby the sleeve is held in place, a puppet-valve and a novel means for operating the same from the end of the faucet or other coupling, so as to open or close the valve, and in certain details of construction.

Figure 1:
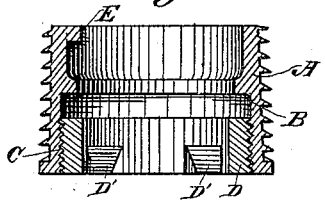
Figure 2:
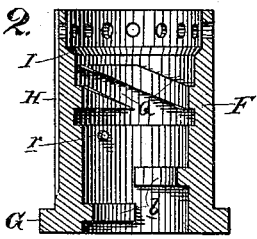
Figure 6:
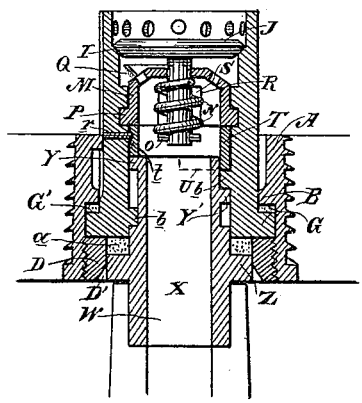
Figure 3:
Figure 7:
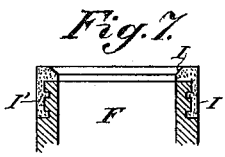
Figure 4:
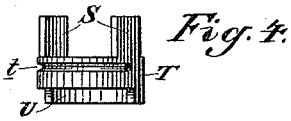
Figure 5:
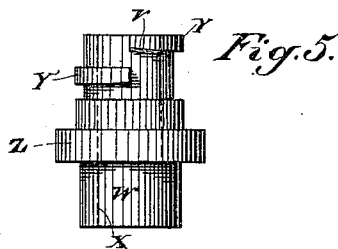

Referring to the accompanying drawings for a more complete explanation of my invention, Figure 1 is a sectional view of the bushing, showing the interior shoulders and the guiding-lug for the supplemental sleeve, also the screw-nut or collar by which the sleeve is fixed in the bushing. Fig. 2 is a sectional view of the cylindrical sleeve which fits into the bushing. Fig. 3 is a view of the valve and the sleeve to which it is connected and by which it is operated. Fig. 4 is a view of the intermediate shell which is acted upon by the faucet or coupling and which in turn acts upon the valve-carrying shell. Fig. 5 is a view of the inner end of the faucet or the coupling which fits into the supplemental sleeve and by which the valve is operated. Fig. 6 is a view of the parts in place with the valve closed upon its seat. Fig. 7 shows the valve-seat made of vulcanized rubber.

The object of this invention is to provide a lock-valve for casks or tanks which is operated so as to open or close it by means of the end of the faucet or coupling through which the liquid is drawn off, and in connection with this of a means for protecting the valve-seat from corrosion and for easily removing the parts, so that they may be cleansed, and to leave a free opening through the bushing when it is necessary to clean the interior of the cask or tank.

A is a bushing having screw-threads upon the outer periphery by which it may be screwed into a hole made in one of the staves of the cask or tank to which it is fitted. This bushing is screwed solidly into place and thereafter remains as a permanent part of the cask or tank. The recess in the outer end of the bushing is larger than the inner end, and thus forms a shoulder at B, and between this shoulder and the inner end of the bushing is a lug or projection E, which serves as a guide for the supplemental sleeve or cylinder F when the latter is introduced into the bushing. This sleeve F has a groove or channel H made in one side which corresponds with the lug E, and it has a projecting flange G of such diameter that it will pass into the outer recess of the bushing A and will rest upon the shoulder B of the bushing. Any suitable fibrous, elastic, or other packing G' surrounds the flange G and lies between it and the shoulder B, so that when the sleeve F is secured in place a tight joint is formed at this point. The body of the sleeve is of such diameter as to slip into the bushing, and the channel H following the lug E as a guide the sleeve is prevented from turning around.

The outer recess in the bushing is screw-threaded, as shown at C, and the collar or annular nut D is fitted to these screw-threads, so that after the sleeve F has been introduced in place this nut or collar is screwed down upon it, thus holding it firmly and preventing any movement within the bushing or leakage between the shoulders of the two. The screw collar or nut D has depressions, as shown at D', for the introduction of a suitable wrench by which it may be turned.

The inner end of the cylindrical sleeve F has a seat I formed upon it, and the puppet-valve J is adapted to close upon this seat. The seat may be at the extreme end of the sleeve, or the sleeve may project beyond the seat, so as to inclose the valve and have perforations made around its sides, through which the liquid may enter, these perforations serving as a strainer to prevent undesirable particles from entering and passing through the valve. The valve has a stem in the center, and this stem passes through the end of a cylindrical shell M. The outer end of this cylindrical shell is turned off into the form of a flat cone having holes opening through it to the interior, so that when the valve is lifted from its seat the liquid passing between the valve and the seat will pass through these holes to the interior of the shell M. The stem or spindle of the valve is surrounded by a spiral spring N, which is held in place by pin O passing through the stem, and the end of the spring presses against the interior of the shell M, so as to draw the valve downward with an elastic pressure, for a purpose to be hereinafter described.

Upon the sides of the shell M are lugs P. The interior of the sleeve F has the spiral channels Q formed in it, and the lugs P enter these spiral channels when the shell M is turned around, and the shell M, carrying the valve, is drawn inward until the valve rests upon the seat I. It will be manifest that after the valve has come in contact with the seat any further turn of the shell M will tend to draw it away from the valve, and in doing this the spring N is compressed, and acting through the pin O upon the stem of the valve it draws the valve upon its seat with an elastic pressure, and this elasticity allows some movement to the shell M beyond the actual closing of the valve.

The sides of the shell M at right angles with the lugs P have the open slots or channels R, and these are fitted to receive the projecting tongues S upon the supplemental shell T. This supplemental shell T is of the same diameter as the shell M and has a groove or channel turned around its periphery, as shown at t. A screw r passes through the side of the cylindrical sleeve F, and its point is shaped so as to enter the groove or channel t, and thus hold this supplemental shell T at a certain point within the sleeve F, while allowing it to be rotated freely but without advancing in either direction. It will be manifest that when this shell T is turned around in one direction the projections S, entering the slots or channels R in the shell M, will turn the latter around, and by means of the lugs P traveling in the inclined slots Q in the interior of the sleeve F, when this shell M is turned around the valve J will be moved, either away from its seat, so as to open a passage, or drawn down upon the seat, as before described, to close it. When the cask or tank is full and there is no connection made for drawing out its contents, this valve will be closed upon its seat and the cask will be sealed up.

The shell T has a semicircular projection U at the outer end, and this projection is adapted to be engaged by a corresponding projection Y upon the inner end of the faucet or coupling W, which serves as a key by which to turn the shells and open or close the valve.

The key W, which, as before stated, may be the inner end of the faucet or a coupling of any description, has a hole through the center, as shown at X, corresponding with the holes through the centers of the shells M and T, so that the contents of the cask, flowing through the valve, may also flow through the center of this key. The inner end of the key has two half-rings Y Y' upon opposite sides and separated from each other longitudinally sufficiently to allow them to fit over corresponding half-rings b, which are formed in the outer end of the cylindrical sleeve F, as plainly shown. It will be seen that when the end of the key or coupling is inserted into the end of the sleeve F the outer half-ring Y will pass the outer half-ring b of the sleeve, after which it may be turned around, so as to pass under the ring b, and the key or coupling can be pushed in again until the outer half-ring Y' will pass beneath the inner half-ring b of the sleeve F, when it may be again turned around, thus forming a combined lock, which holds the parts firmly in place.

Z is a collar formed around the periphery of the key or coupling at such a point that an elastic washer a, surrounding the coupling beneath this collar, will be pressed against the flange G of the sleeve F when the coupling is in place, and will thus form a tight joint at that point.

If desired, the end of the half-ring Y may be slightly beveled off, as shown at V, so that as the coupling is turned to lock it in place beneath the rings b of the sleeve F this bevel will serve to draw the coupling slightly inward, so as to compress the packing-ring a, or this compression may take place by exerting a slight pressure upon the coupling when it is being turned into place. When the coupling is in its proper place, the inner half-ring Y will, as before described, engage the projecting half-ring U on the shell T, and by turning the coupling around the valve is opened, as before described. The coupling, however, is not advanced in either direction, because the half-rings b b and the corresponding half-rings Y Y' on the coupling are in planes at right angles with the axis of the coupling and do not form spiral or inclines; neither is the intermediate shell T advanced; but it serves simply as a medium by which the shell carrying the valve is moved, and this movement, as before described, is effected by the engagement of the projections S with the channels R of the shell M.

It will be manifest that whenever it is desired to cleanse the cask and have a free opening through the bushing it will only be necessary to remove the locking nut or collar D, when the sleeve F, with its contained valve and mechanism, may be removed, leaving a large clear opening through the bushing.

This device will be especially useful upon beer and wine casks and tanks, and by reason of the active fermenting principle contained within these liquors acetic acid is apt to be formed when any dregs are left in the casks, and this attacks and soon destroys the valve and valve-seat. I therefore form the valve-seat I of hard rubber, which is not acted upon by this acid, and a sleeve I', which forms an extension of this valve-seat, extends down around the outside of the sleeve F, as shown, being secured thereto by grooves, channels, or openings into which the plastic rubber may be vulcanized, so as to hold it firmly and permanently in place. For the same reason the valve itself may be made of the same material.

Having thus described my invention, what I claim as new, and desire to secure by Letters Patent, is—

1. A bushing adapted to be fixed permanently into the cask or tank, having the recessed outer end and a shoulder formed within it, a projecting lug interior to the shoulder, and screw-threads formed within the outer recess, in combination with a sleeve having a groove or channel to fit over the projecting lug and a flange around its outer end, between which and the shoulder of the bushing a packing-ring is fitted, and a screw-threaded collar or nut D fitting the threads in the interior of the bushing, whereby the supplemental sleeve is locked within the bushing and prevented from rotating, substantially as herein described.

2. A bushing fixed within a cask or tank, having a projecting lug E, in combination with a removable sleeve fitting within the bushing, having a groove or channel engaging said lug, whereby the sleeve is prevented from turning, and an annular nut fitting the bushing and bearing against the sleeve to retain it in place, substantially as herein described.

3. A bushing permanently fixed in the cask or tank, having the interior shoulder and guide-lug, as shown, a sleeve adapted to fit said bushing, channeled so as to be guided upon the lug, with a flange fitting upon the shoulder of the bushing, a valve-seat formed upon its inner end, and spiral grooves or channels extending outwardly from the valve-seat, in combination with a puppet-valve fitting said seat, a cylindrical perforated shell through the center of which the valve-stem passes, lugs upon the exterior of said shell fitting the spiral channels in the supplemental sleeve, a spring surrounding the valve-stem within the shell, and means whereby the shell and valve may be rotated so as to open or close the valve, substantially as herein described.

4. A bushing permanently fixed within a cask or tank having the non-rotating sleeve fitted therein, with a packing to prevent leakage between the two, a valve-seat formed on the inner end of the sleeve, spiral channels extending outwardly from said seat, a puppet-valve fitting said seat, a cylindrical shell having lugs upon its outer periphery to engage the spiral channels in the sleeve, and a hole through one end, through which the stem of the valve passes, a spiral spring surrounding the stem and acting to draw the valve against its seat, a second shell adapted to turn within the cylindrical sleeve without advancing in either direction, and lugs and locking devices by which said second shell engages the shell which carries the valve, and a key or coupling by which said second shell may be turned so as to move the valve-carrying shell and cause it to advance in either direction to open or close the valve, substantially as herein described.

5. The combination of a bushing fixed permanently in a tank or cask, a non-rotating removable sleeve fixed within a bushing and having a valve-seat at its inner end, inclined channels extending from the valve-seat toward the outer end of the sleeve, a rotatable shell having lugs engaging said channels, a valve fitting the valve-seat, having a stem entering the shell, and means for holding the rotatable shell in position, substantially as herein described.

6. A bushing fixed permanently in a cask or tank, a non-rotating removable sleeve fixed within the bushing and having a valve-seat at its inner end, inclined channels extending from the valve-seat toward the outer end of the sleeve, a shell rotatable within the sleeve, with exterior lugs fitting the inclined channels, a valve the stem of which enters the end of the shell and a spring connected therewith, an intermediate shell rotatable within the sleeve without longitudinal advance, and lugs by which it is connected with the valve-carrying shell, a key or coupling having semicircular rings or bands Y Y', corresponding bands b b within the outer end of the sleeve, with which they engage, and a lug upon the intermediate shell, which is engaged by the inner end of the key or coupling, substantially as herein described.

In witness whereof I have hereunto set my hand.

CHARLES E. MASON.

Witnesses:
S. H. NOURSE,
H. C. LEE.